May 21, 1929.　　　F. G. JOHNSON　　　1,714,373
TIRE TEST GAUGE AND THE LIKE
Filed June 2, 1928
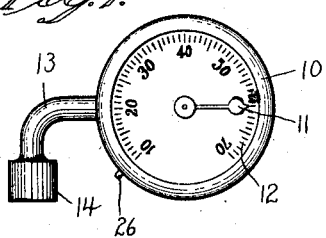
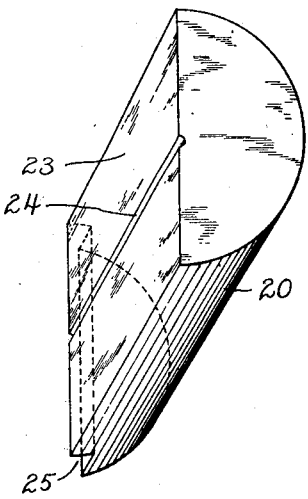
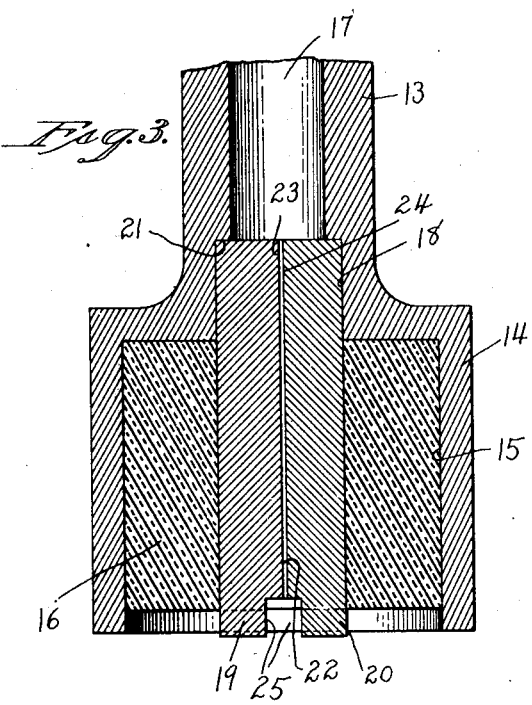
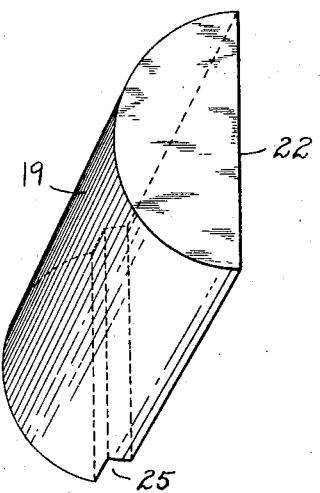
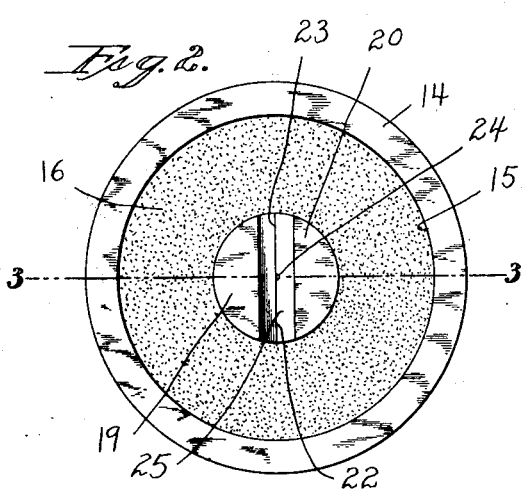
Inventor.
Frederick G. Johnson
by Seymour Earle & Nichols
atty.

Patented May 21, 1929.

1,714,373

UNITED STATES PATENT OFFICE.

FREDERICK G. JOHNSON, OF NEW HAVEN, CONNECTICUT.

TIRE TEST GAUGE AND THE LIKE.

Application filed June 2, 1928. Serial No. 282,304.

This invention relates to an improvement in pressure-indicating gauges and particularly to air-pressure gauges for testing automobile tires, though not so limited.

One of the major problems in connection with the production of tire-gauges has been to provide means for preventing the air from so rapidly entering and actuating the gauge as to cause its pointer to be "kicked" around the guage-dial rather than causing the said pointer to be gradually moved to the position upon the dial which correctly indicates the pressure, without any excess or over-riding movement. Many expedients have been resorted to for the purpose of admitting air to the gauge-mechanism slowly, among which may be mentioned the packing of the inlet-opening with felt, asbestos, etc., so as to retard the passage of air. Attempts have also been made to drill very fine ingress passages through the gauge-nipple, but it has been impossible, in a practical sense, to make and use drills sufficiently fine (two or three thousandths of an inch in diameter) for this purpose.

The object of this invention is to produce at a low cost for manufacture a simple and reliable pressure-gauge having a very fine air-inlet passage whereby the flow of air into the gauge-mechanism is sufficiently retarded to prevent the rapid or over-riding movement of the gauge-pointer.

With this object in view, my invention consists in a pressure-gauge formed with an inlet-passage, a plug positioned in said inlet-passage and formed with a shallow incised groove connecting with the said inlet-passage and having its open side in contact with a surface to close its said open side; whereby the said groove is converted into a tubular channel of small cross-sectional area.

The invention further consists in a pressure-gauge characterized as above and having certain other details of construction and combinations of parts as will be hereinafter described and particularly recited in the claims.

In the accompanying drawings:

Fig. 1 is a view in front elevation of a tire test-gauge embodying my invention;

Fig. 2 is an enlarged-scale underside view of the gauge-nipple;

Fig. 3 is a broken axial sectional view on the line 3—3 of Fig. 2;

Fig. 4 is a detached perspective view of the incised plug-member; and

Fig. 5 is a corresponding view of the complementary plug-member.

In the accompanying drawings, 10 represents a tire test-gauge of any of the well-known types which is provided with the usual pointer 11 sweeping over graduations 12 upon its dial. Extending outward from one side of the body of the test-gauge is a curved tubular stem 13 terminating in an enlarged head or nipple 14 formed with an outwardly-opening chamber 15 for the reception of a washer-like body 16 of soft rubber or equivalent material. The channel 17 of the tubular stem 13 intersects the chamber 15 in the nipple 14 and is enlarged near its junction with the said chamber to provide a cylindrical socket 18 for the reception of the inner ends of two complementary plug-members 19 and 20 which are seated against a shoulder 21 forming the bottom of the socket 18.

The complementary plug-members 19 and 20 above referred to are each semicircular in cross-section and are together forced tightly into the socket 18 and against the shoulder 21 thereof in such position that their respective flat inner faces 22 and 23 are in engagement, as clearly shown in Figs. 2 and 3 of the drawings.

The plug-member 20 is provided centrally upon its flat inner face with a shallow longitudinal groove 24 extending from end to end thereof and connected at its inner end with the channel 17 of the stem 13. The groove 24 is formed in the plug-member 20 by merely scratching its flat inner face 23 with a sharp tool and has its open outer side closed by the adjacent flat face 22 of the plug-member 19, so that the said groove is thus converted into a tubular channel leading from the outer end of the plug composed of the members 19 and 20, to the inner end thereof where it intersects the channel 17 in the tubular stem 13.

To prevent the metal surrounding the outer terminal of the groove 24 from becoming clogged, burred, or otherwise so deformed as to unduly constrict the said groove, I form the plug-members 19 and 20 at the outer ends of their flat inner faces respectively with shallow notches 25 which face each other, as shown in Figs. 2 and 3 of the drawings, so as to virtually create a diametrical groove across the outer face of the plug which, as above noted, is composed of the complementary members 19 and 20.

By forming a channel through the plug-member in the manner above described, I am enabled to make it of such small cross-sectional area that when the nipple 14 of the tire-gauge is pressed down upon the stem of an automobile tire so as to open the valve thereof in the usual manner of tire test-gauges, the air released from the tire can build up pressure only very gradually in the channel 17 of the stem 13 and in the gauge-mechanism to which the latter conducts the air, so that the pointer is slowly swung around the dial in response to the gradually increasing pressure within the gauge; the said pointer halting when the pressure within the gauge corresponds to the pressure within the tire.

Were it not for the small cross-sectional area of the groove 24, the air would enter the gauge-mechanism with such rapidity as to so rapidly build up the pressure therein and consequently impart a snappy impulse to the pointer 11 which would as a result, be swung to a point far beyond the correct graduation upon the dial and hence mislead the user into supposing that the tire pressure was greatly in excess of what actually existed therein.

It will be understood that the washer-like body 16 of soft rubber serves to seal the outer end of the tire-stem when the gauge is applied thereto so as to prevent the air within the tire from escaping outward into the atmosphere. Also, after the gauge has been applied to the tire-stem to indicate the air-pressure in the tire, and a reading has been taken, I provide a finger-piece 26 by means of which the pointer 11 may be again swung back to zero preparatory to a subsequent tire-testing operation. This resetting feature is common in tire-gauges and requires no detail description.

I claim:

1. The combination with a pressure-gauge formed with an inlet-passage; of a plug interposed in the said inlet-passage and composed of two complementary members having abutting faces, one of the said members being formed in its face with a shallow incised groove connecting with the said inlet-passage and having its open side closed by the surface of the complementary member; whereby the said groove is converted into a tubular channel of small cross-sectional area.

2. The combination with a pressure-gauge formed with an inlet-passage; of a cylindrical member interposed in the said inlet-passage and composed of two complementary members each of semicircular form in cross-section and having their flat inner faces abutted, one of the said members being formed in its abutting face with a shallow incised groove connecting with the said inlet-passage and having its open side closed by the flat face of the complementary member; whereby the said groove is converted into a tubular channel of small cross-sectional area.

3. The combination with a pressure-gauge formed with an inlet-passage enlarged to form a socket; of a plug positioned in the said socket and composed of two complementary members having abutting faces, one of the said members being formed in its abutting face with a shallow incised groove connecting with the said passage and having its open side closed by the abutting surface of the complementary member; whereby the said groove is converted into a tubular channel of small cross-sectional area.

4. The combination with a pressure-gauge formed with an inlet-passage enlarged to form a socket; of a cylindrical plug positioned in the said socket and composed of two complementary members each of semicircular form in cross-section and having abutting faces, one of the said members being formed in its abutting face with a shallow incised groove connecting with the said inlet-passage and having its open side closed by the flat face of the complementary member; whereby the said groove is converted into a tubular channel of small cross-sectional area.

In testimony whereof, I have signed this specification.

FREDERICK G. JOHNSON.